United States Patent
Sastry

(10) Patent No.: US 11,386,142 B1
(45) Date of Patent: Jul. 12, 2022

(54) SENSOR BASED PROCESSING OF DATA FROM A USER FOR LEARNING USING ARTIFICIAL INTELLIGENCE MODULE

(71) Applicant: Amesite Inc., Ann Arbor, MI (US)

(72) Inventor: Ann Marie Sastry, Ann Arbor, MI (US)

(73) Assignee: Amesite Inc., Ann Arbor, MI (US)

( * ) Notice: Subject to any disclaimer, the term of this patent is extended or adjusted under 35 U.S.C. 154(b) by 534 days.

(21) Appl. No.: 16/252,409

(22) Filed: Jan. 18, 2019

Related U.S. Application Data

(60) Provisional application No. 62/619,509, filed on Jan. 19, 2018.

(51) Int. Cl.
| | |
|---|---|
| *G06F 16/00* | (2019.01) |
| *G06F 16/48* | (2019.01) |
| *G06F 16/38* | (2019.01) |
| *G06N 20/00* | (2019.01) |
| *G06F 16/78* | (2019.01) |
| *G06F 16/58* | (2019.01) |
| *G06F 16/9035* | (2019.01) |

(52) U.S. Cl.
CPC .............. *G06F 16/48* (2019.01); *G06F 16/38* (2019.01); *G06F 16/58* (2019.01); *G06F 16/78* (2019.01); *G06F 16/9035* (2019.01); *G06N 20/00* (2019.01)

(58) Field of Classification Search
CPC ............................. G06F 16/9035; G06F 16/907
See application file for complete search history.

(56) References Cited

U.S. PATENT DOCUMENTS

| | | | |
|---|---|---|---|
| 10,452,974 B1 * | 10/2019 | Cosic | G06N 3/08 |
| 2014/0130073 A1 * | 5/2014 | Yu | H04N 21/44222 725/14 |
| 2015/0066820 A1 * | 3/2015 | Kapur | G06N 20/00 706/12 |
| 2015/0243176 A1 * | 8/2015 | Zaslavsky | G06Q 50/20 434/322 |
| 2017/0140456 A1 * | 5/2017 | Kong | H04L 67/22 |
| 2017/0236434 A1 * | 8/2017 | Mehta | G09B 5/08 434/350 |
| 2017/0315048 A1 * | 11/2017 | Hsu | G01N 15/1436 |
| 2017/0317890 A1 * | 11/2017 | Puleri | H04L 41/147 |
| 2019/0034897 A1 * | 1/2019 | Gao | G06Q 20/202 |

OTHER PUBLICATIONS

Handri, Santoso, et al. "Evaluation of student's physiological response towards E-learning courses material by using GSR sensor." 2010 IEEE/ACIS 9th International Conference on Computer and Information Science. IEEE, 2010.*

Villaroman, Norman, Dale Rowe, and Bret Swan. "Teaching natural user interaction using OpenNI and the Microsoft Kinect sensor." Proceedings of the 2011 conference on Information technology education. 2011.*

* cited by examiner

*Primary Examiner* — Nan Hutton
(74) *Attorney, Agent, or Firm* — Richard T. Ogawa; Ogawa P.C.

(57) ABSTRACT

In an example, the present invention provides a meta data processing apparatus for processing sensor inputs and providing feedback to a user for an on-line course.

14 Claims, 7 Drawing Sheets

SENSOR BASED PROCESSING OF DATA FROM A USER FOR LEARNING USING ARTIFICIAL INTELLIGENCE MODULE

CROSS REFERENCE TO RELATED PATENT APPLICATION

This application claims priority to U.S. Provisional Patent Application No. 62/619,509, filed on Jan. 19, 2018, which is hereby incorporation by reference in its entirety.

BACKGROUND OF INVENTION

The present invention relates generally to processing techniques for learning course materials. More particularly, the invention provides a method and system using data capturing devices configured with artificial intelligence techniques. Merely by way of example, the invention has been applied to a mobile computing device, however, the invention has many other applications.

"Education is the process of facilitating learning, or the acquisition of knowledge, skills, values, beliefs, and habits. Educational methods include storytelling, discussion, teaching, training, and directed research. Education frequently takes place under the guidance of educators, but learners may also educate themselves. Education can take place in formal or informal settings and any experience that has a formative effect on the way one thinks, feels, or acts may be considered educational. The methodology of teaching is called pedagogy." https://en.wikipedia.org/wiki/Education.

Education originally occurred through a one by one basis between teacher and student or master and apprentice or partner and associate. Classrooms eventually took over to teach children in masses from pre-school to higher education. Most recently, education has been implemented on-line via the Internet to facilitate learning for students. Although education has progressed, it is desired that techniques to overcome difficulties in education, and more particularly learning are desired.

SUMMARY

According to the present invention, techniques related to learning course materials are provided. More particularly, the invention provides a method and system using data capturing devices configured with artificial intelligence techniques. Merely by way of example, the invention has been applied to a mobile computing device, however, the invention has many other applications.

In an example, the present invention provides a meta data processing apparatus for processing sensor inputs and providing feedback to a user for an on-line course. The apparatus has a housing configured with a display device. In an example, the display device is coupled to an input device for communicating text information from a user. The device has a processing device, such as a central processing unit, graphics processing unit, digital signal processing unit, micro controller or others.

In an example, the apparatus has a network interface coupled to the processing device. In an example, the network interface is configured to couple to a world wide network of computers or a local network of computers. The apparatus has a memory resource coupled to the processing device and an application comprising a course module. In an example, the course module comprises a plurality of templates and at least one video file, and processes, each of which may be desirably tailored to a user based upon feedback from various processing modules. In an example, the course module provides a practical application for a user and configures together various elements that have been described herein.

In an example, the apparatus has an image capturing device coupled to the housing and configured to the processing device. In an example, the image capturing device is configured to capture an image of at least a facial expression in a first format of the user while interacting with the course module that can include an artificial intelligence module, various input output devices and related interfaces, a decision feed back module and process, among other elements herein. The image capturing device can be a high resolution camera that is suitable for capturing the image and has sufficient pixels to be processed.

In an example, the apparatus has a plurality of sensors for identifying a spatial orientation of the user while interacting with the course module. In an example, the sensor devices or plurality of external data capturing devices comprises a camera, a keyboard, an accelerometer sensor, an rf sensor, a gyroscope, a chemical sensor, a temperature sensor, a microphone, or other input device. Of course, there can be other variations, modifications, and alternatives.

In an example, the apparatus has a natural language processor configured for processing information from the text information while the user is interacting with the course module. In an example, the natural language processor is configured to process the text information to identify a characteristic of the user in association with the course. Additionally, the apparatus has an artificial intelligence module coupled to the processing device. In an example, the artificial intelligence module comprises a neural network module comprising a plurality of nodes. In an example, the plurality of nodes can be numbered from 1-N, where N is an integer greater than 10 and less than 10,000,000, and possibly greater, depending upon the example. The plurality of nodes are coupled to respective sensors, image capturing device, natural language processor, or other information receiving devices, and an output. Of course, there can be other variations, modifications, and alternatives. In an example, the processor can be rule based or statistics based.

In an example, the apparatus has an output handler coupled to the output of the neural network module, the output handler configured to provide feedback to the user. The feedback comprises a plurality of characteristics to allow the user to achieve a predetermined score within a range for the course.

The above examples and implementations are not necessarily inclusive or exclusive of each other and may be combined in any manner that is non-conflicting and otherwise possible, whether they be presented in association with a same, or a different, embodiment or example or implementation. The description of one embodiment or implementation is not intended to be limiting with respect to other embodiments and/or implementations. Also, any one or more function, step, operation, or technique described elsewhere in this specification may, in alternative implementations, be combined with any one or more function, step, operation, or technique described in the summary. Thus, the above examples implementations are illustrative, rather than limiting.

DETAILED DESCRIPTION OF THE EXAMPLES

According to the present invention, techniques related to learning course materials are provided. More particularly, the invention provides a method and system using data capturing devices configured with artificial intelligence techniques. Merely by way of example, the invention has been applied to a mobile computing device, however, the invention has many other applications.

Figure 1A:
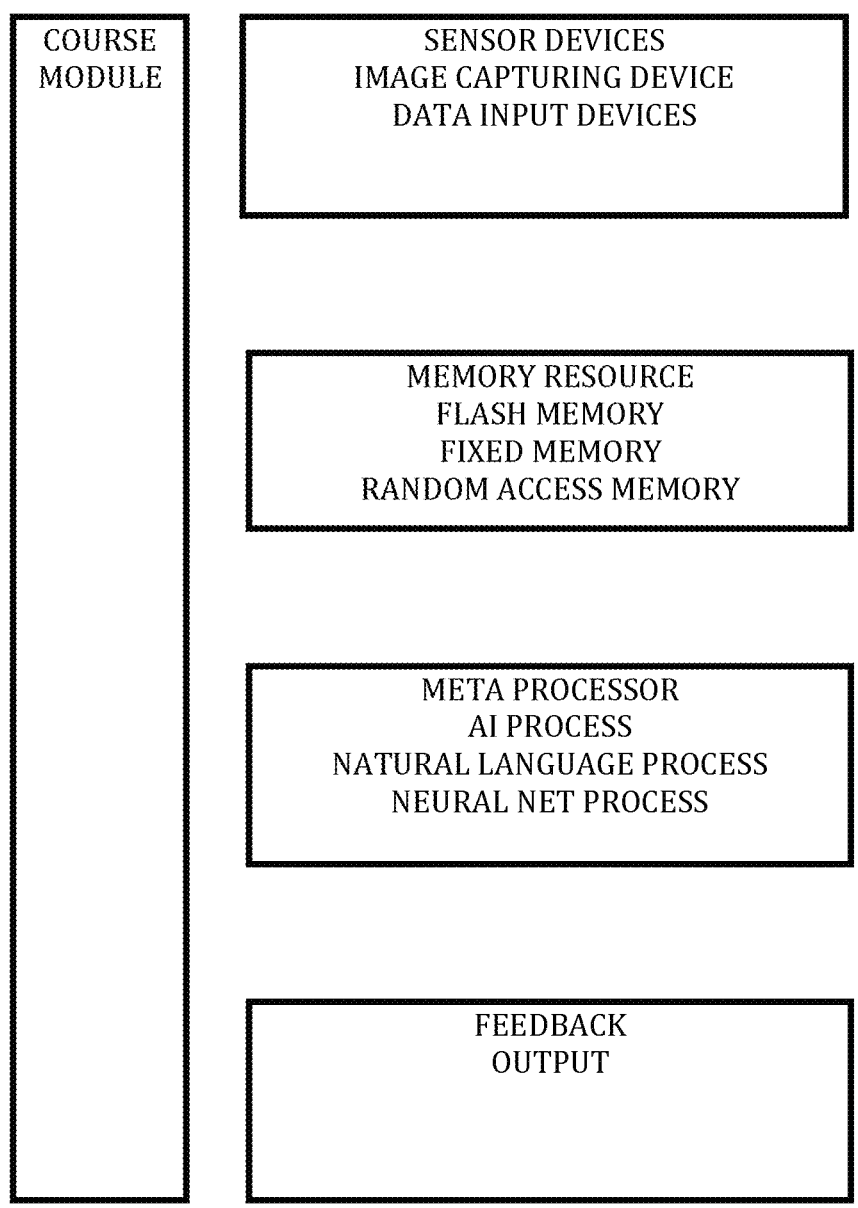
FIG. 1A is a simplified diagram of a meta processing system for learning according to an example of the present invention.

FIG. 1A is a simplified diagram of a meta processing system for learning according to an example of the present invention. As shown, the system has a course module, which includes templates, video, and other information. The course can be directed to a variety of subjects including but not limited to science, math, English, history, psychology, engineering, business, finance, accounting, or any other college course subject.

As shown, the course module is configured with a plurality of sensor devices, an image capturing device, and data input device. In an example, the sensor devices or plurality of external data capturing devices comprises a camera, a keyboard, an accelerometer sensor, an rf sensor, a gyroscope, a chemical sensor, a temperature sensor, a microphone, or other input device. Of course, there can be other variations, modifications, and alternatives.

In an example, the system has a meta processor. The meta processor includes an artificial intelligence process, a natural language process, and neural net process each of which can be run configured with each other or independently from each other.

In an example, the invention provides a method of using the meta module process of capturing data and processing the data for feedback to a user, e.g., learner, student, or other human entity. In an example, the method includes providing information related to a course in a first format. In an example, the course can be sourced from an off-line classroom course.

In an example, the method includes transferring the information in the first format to a server device. The server device can ben coupled to a plurality of computers on a world wide network of computers, such as the Internet. In an example, the method includes storing the information in the first format into a memory resource coupled to the server device.

In an example, the method includes processing the information related to the course on the server device to convert the course into a second format, the second format comprising a plurality of templates and a video. The second format is suitable for using the course in an on-line manner.

The method configures the course in the second format with a meta module. As noted, the meta module comprises an artificial intelligence module. In an example, the artificial intelligence module comprises a plurality of input interfaces each of the input interfaces coupled to a node. In an example, each of the nodes comprises a weighing function. In an example, each of the nodes is coupled to an output interface.

In an example, the artificial intelligence module comprises a neural network process configured on a neural network process, wherein the plurality of nodes comprises at least 1 million nodes. In an example, the artificial intelligence module comprises a neural network process configured on a processing device.

In an example, the method includes configuring the course coupled to the artificial intelligence module to a plurality of external data capturing devices. Each of the plurality of external data captures devices being spatially disposed on a mobile computing device. In an example, the mobile computing device is coupled to the world wide network of computers.

In an example, the method includes initiating use of the course in the second format coupled to the artificial intelligence module from the mobile computing device and capturing data from a user of the mobile computing device from each of the plurality of external data capturing devices, while the user is actively interacting with the course in the second format from the mobile computing device.

In an example, the method includes transferring data from each of the plurality of external data capturing devices from the mobile computing device to the artificial intelligence module and, thereafter, outputting a feedback from the artificial intelligence module to the user of the course.

In an example, the method also includes finalizing use of the course in the second format; and initiating a test associated with the course. Optionally, the method includes finalizing use of the course in the second format; initiating a test associated with the course; passing the test; and transferring a credit for the course to the user of the mobile device and the course. Of course, there can be other variations, modifications, and alternatives.

Optionally, the method can also includes transferring spatial movement information from a wearable device to the mobile computing device. The wearable device can be a watch, a suit, a vest, a headset, a pair of glasses, a pair of pants, shoes, or other wearable device. The wearable device can include a plurality of sensing devices spatially disposed on the device. A wireless or wired transceiver or transmitter can transmit information from each of the sensors to the meta processor.

In an example, the course module and other elements can be implemented using a mobile device. In an example, the mobile device is a lap top computer, a tablet, an iPad, a Smart phone, or other mobile device. Of course, there can be other variations, modifications, and alternatives.

In an alternative example, the present invention provides a meta data processing apparatus for processing sensor inputs and providing feedback to a user for an on-line course. The apparatus has a housing configured with a display device. In an example, the display device is coupled to an input device for communicating text information from a user. The device has a processing device, such as a central processing unit, graphics processing unit, digital signal processing unit, micro controller or others.

In an example, the apparatus has a network interface coupled to the processing device. In an example, the network interface is configured to couple to a world wide network of computers or a local network of computers. The apparatus has a memory resource coupled to the processing device and an application comprising a course module. In an example, the course module comprises a plurality of templates and at least one video file, and processes, each of which may be desirably tailored to a user based upon feedback from various processing modules.

In an example, the apparatus has an image capturing device coupled to the housing and configured to the processing device. In an example, the image capturing device is configured to capture an image of at least a facial expression in a first format of the user while interacting with the course module. The image capturing device can be a high resolution camera that is suitable for capturing the image and has sufficient pixels to be processed.

In an example, the apparatus has a plurality of sensors for identifying a spatial orientation of the user while interacting with the course module. In an example, the sensor devices or plurality of external data capturing devices comprises a camera, a keyboard, an accelerometer sensor, an rf sensor, a gyroscope, a chemical sensor, a temperature sensor, a microphone, or other input device. Of course, there can be other variations, modifications, and alternatives.

In an example, the apparatus has a natural language processor configured for processing information from the text information while the user is interacting with the course module. In an example, the natural language processor is configured to process the text information to identify a characteristic of the user in association with the course. Additionally, the apparatus has an artificial intelligence module coupled to the processing device. In an example, the artificial intelligence module comprises a neural network module comprising a plurality of nodes. In an example, the plurality of nodes can be numbered from 1-N, where N is an integer greater than 10 and less than 10,000,000, and possibly greater, depending upon the example. The plurality of nodes are coupled to respective sensors, image capturing device, natural language processor, or other information receiving devices, and an output. Of course, there can be other variations, modifications, and alternatives.

In an example, the apparatus has an output handler coupled to the output of the neural network module, the output handler configured to provide feedback to the user. The feedback comprises a plurality of characteristics to allow the user to achieve a predetermined score within a range for the course.

In an example, the course is related to science, math, English, history, psychology, engineering, business, finance, accounting, or any other college course subject.

In an example, the apparatus includes a wearable device comprising a set of sensors to characterize movement, orientation, temperature, heart rate, breathing rate, oxygen, and other parameters of the user while interacting with the course, the wearable device being coupled to an input of the artificial intelligence module.

In an example, the housing is shock proof.

In an example, the neural network module is configured to receive information from the image capturing device and output a learning characteristic of the user.

In an example, the neural network module is configured to receive information associated with a facial expression and an eye response from the image capturing device and output a learning characteristic of the user.

In an example, the method includes transferring a spatial location information and a time information to the artificial intelligence module.

In a preferred example, the an output handler coupled to the output of the neural network module, the output handler configured to provide feedback to the user and configure the myamesite™ course. The myamesite course has been configured with feedback to create a specialized or personalized course for the user or student. Further details of the present method, apparatus, and system can be found throughout the present specification and more particularly below.

Figure 1:
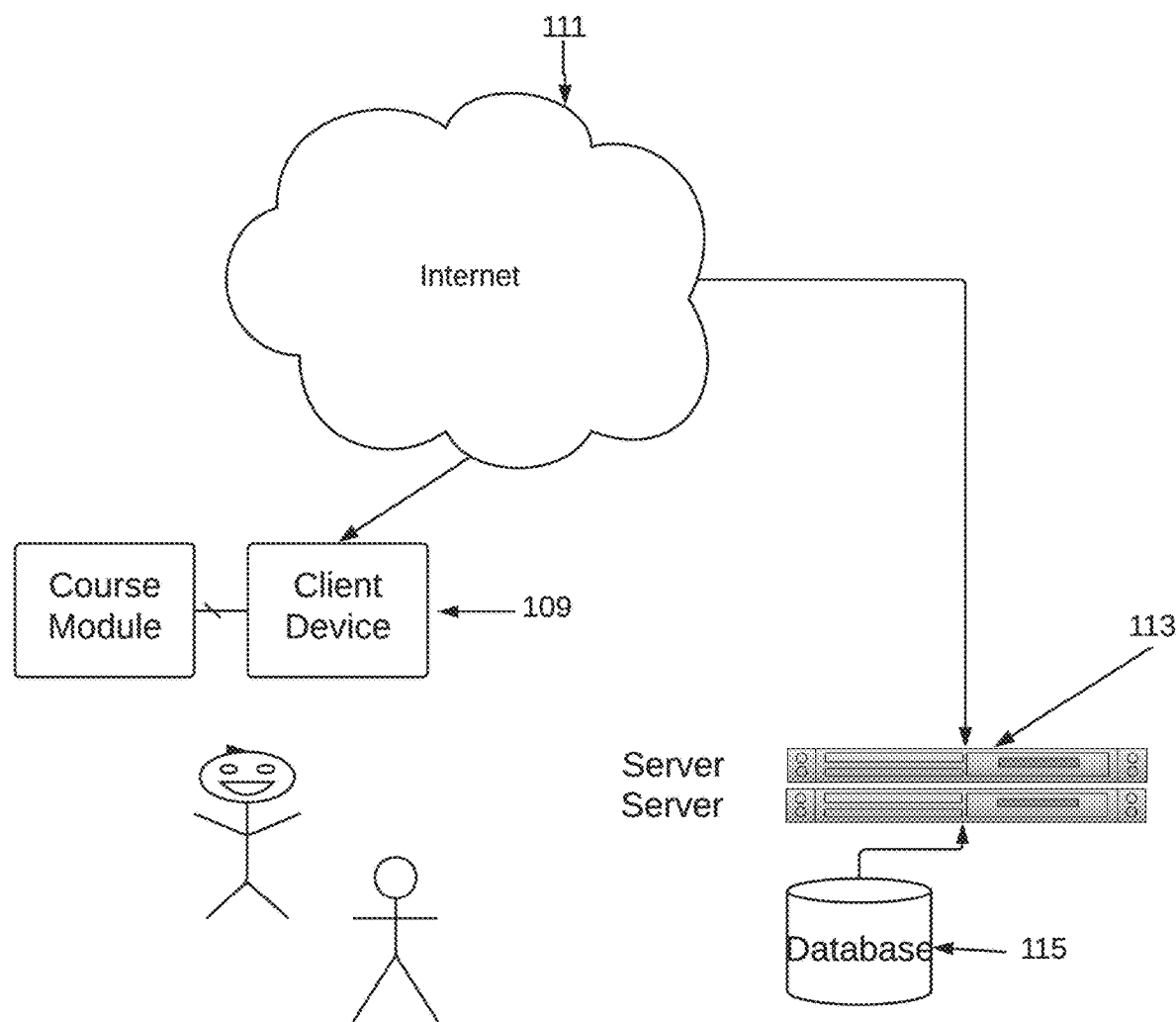
FIG. 1 is a simplified diagram with a network system according to an example of the present invention.

FIG. 1 is a simplified diagram with a network system according to an example of the present invention. As shown, the network system has a course module, which is coupled to a client device 109, which is coupled to a world wide network of computers, such as the Internet 111. In an example, the Internet comprises a plurality of server devices 113 coupled to memory resource 115 or database.

Figure 2:
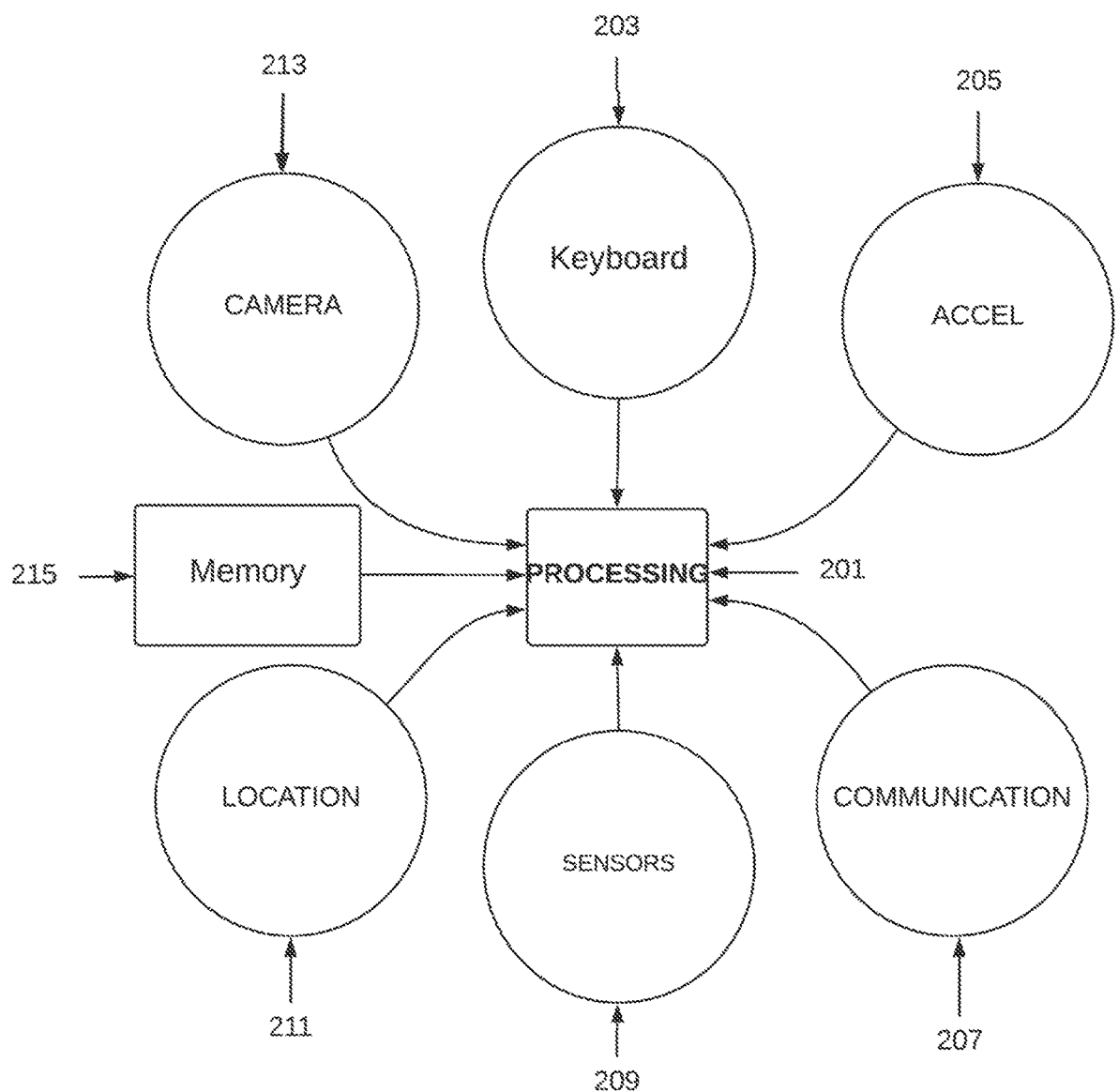
FIG. 2 is a more detailed diagram of a processing engine with input devices according to an example of the present invention.

FIG. 2 is a more detailed diagram of a processing engine with input devices according to an example of the present invention. In an example, the processing engine 201 is coupled to input devices 203, 205, 207, 209, 211, 214, among others. The processing engine interfaces with a memory resource, such as storage 215.

In an example, the processing engine is configured with a meta data processing apparatus for processing sensor inputs and providing feedback to a user for an on-line course. The apparatus has a housing configured with a display device. In an example, the display device is coupled to an input device for communicating text information from a user. The device has a processing device, such as a central processing unit, graphics processing unit, digital signal processing unit, micro controller or others.

In an example, the apparatus has a network interface 207 coupled to the processing device. In an example, the network interface is configured to couple to a world wide network of computers or a local network of computers. The apparatus has a memory resource 215 coupled to the processing device and an application comprising a course module. In an example, the course module comprises a plurality of templates and at least one video file, and processes, each of which may be desirably tailored to a user based upon feedback from various processing modules.

In an example, the apparatus has an image capturing device coupled to the housing and configured to the processing device. In an example, the image capturing device is configured to capture an image of at least a facial expression in a first format of the user while interacting with the course module. The image capturing device can be a high resolution camera that is suitable for capturing the image and has sufficient pixels to be processed.

In an example, the apparatus has a plurality of sensors for identifying a spatial orientation of the user while interacting with the course module. In an example, the sensor devices or plurality of external data capturing devices comprises a camera, a keyboard, an accelerometer sensor, an rf sensor, a gyroscope, a chemical sensor, a temperature sensor, a microphone, or other input device. Of course, there can be other variations, modifications, and alternatives.

In an example, the apparatus has a natural language processor configured for processing information from the text information while the user is interacting with the course module. In an example, the natural language processor is configured to process the text information to identify a characteristic of the user in association with the course. Additionally, the apparatus has an artificial intelligence module coupled to the processing device. In an example, the artificial intelligence module comprises a neural network module comprising a plurality of nodes. In an example, the plurality of nodes can be numbered from 1-N, where N is an integer greater than 10 and less than 10,000,000, and possibly greater, depending upon the example. The plurality of nodes are coupled to respective sensors, image capturing device, natural language processor, or other information receiving devices, and an output. Of course, there can be other variations, modifications, and alternatives.

In an example, the apparatus has an output handler coupled to the output of the neural network module, the output handler configured to provide feedback to the user. The feedback comprises a plurality of characteristics to allow the user to achieve a predetermined score within a range for the course.

In an example, the course is related to science, math, English, history, psychology, engineering, business, finance, accounting, or any other college course subject.

In an example, the apparatus includes a wearable device comprising a set of sensors to characterize movement, orientation, temperature, heart rate, breathing rate, oxygen, and other parameters of the user while interacting with the course, the wearable device being coupled to an input of the artificial intelligence module.

In an example, the housing is shock proof.

In an example, the neural network module is configured to receive information from the image capturing device and output a learning characteristic of the user.

In an example, the neural network module is configured to receive information associated with a facial expression and an eye response from the image capturing device and output a learning characteristic of the user.

In an example, the method includes transferring a spatial location information and a time information to the artificial intelligence module.

In a preferred example, the an output handler coupled to the output of the neural network module, the output handler configured to provide feedback to the user and configure the myamesite™ course. The myamesite course has been configured with feedback to create a specialized or personalized course for the user or student.

Figure 3:
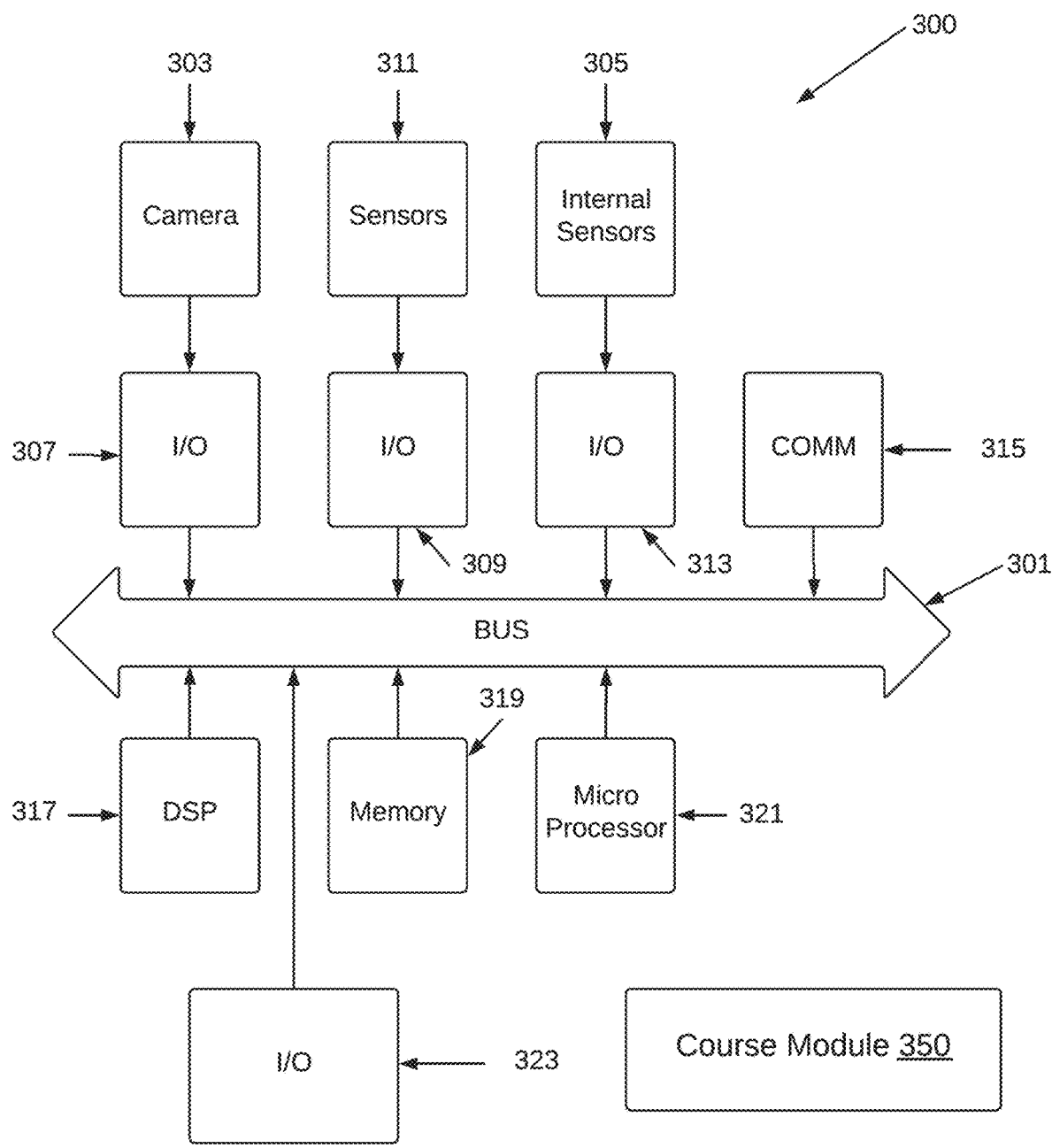
FIG. 3 is a more detailed diagram of a processing system according to an example of the present invention.

FIG. 3 is a more detailed diagram of a processing system 300 according to an example of the present invention. As shown, the system has a bus 301 that communicates with input output devices 307, 309, 313. The input output devices is coupled to camera 303, sensors 311, and internal sensors 305. The bus also has communication module 315, a digital signal processor 317, other input output devices 323, memory resource 319, and microprocessor 321. The bus also communications with course module 350, which has been previously explained throughout this specification.

Figure 4:
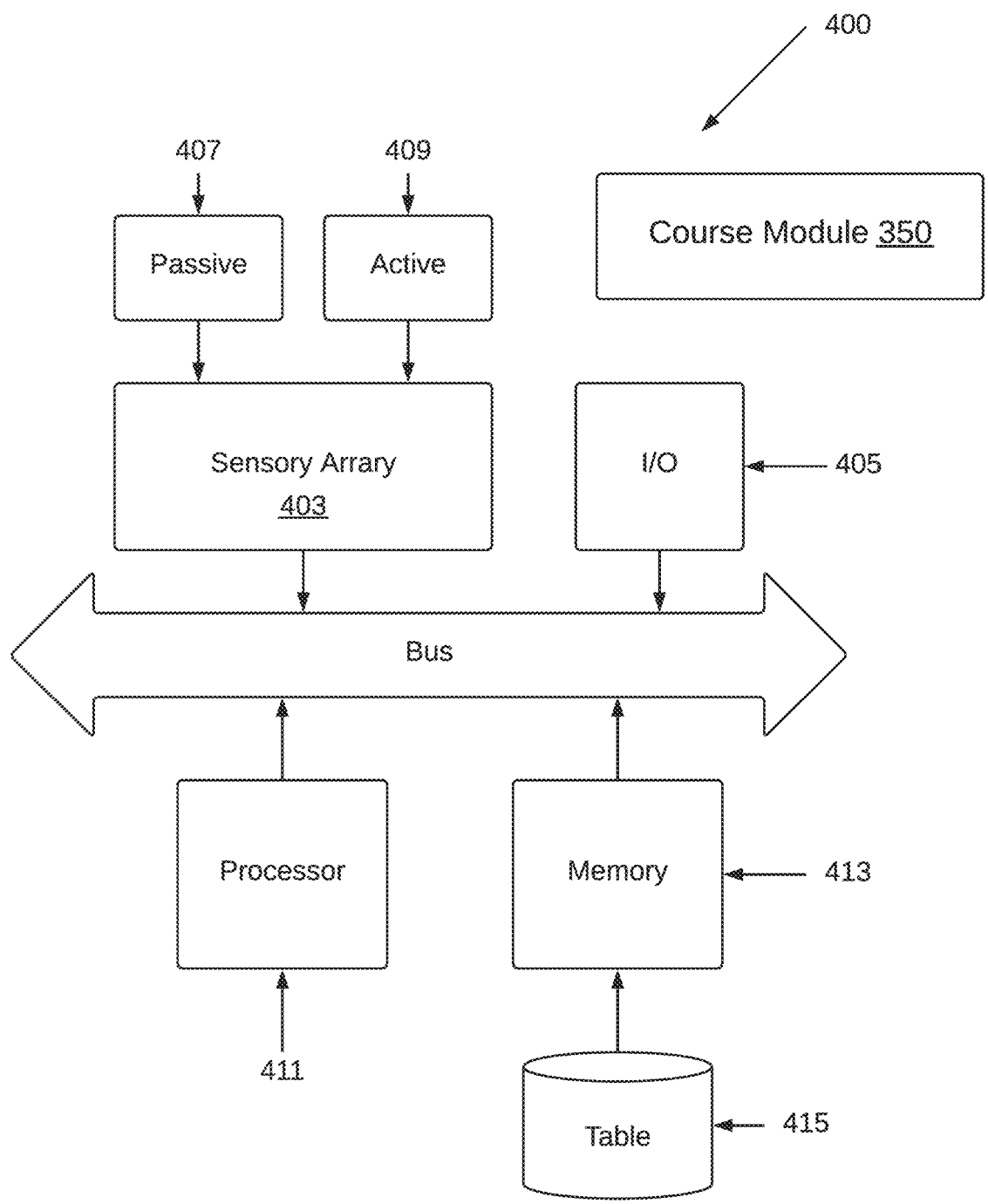
FIG. 4 is a more detailed diagram of an alternative processing system according to an example of the present invention.

FIG. 4 is a more detailed diagram of an alternative processing system 400 according to an example of the present invention. As shown, the system has a bus that communicates to a sensor array 403, which includes both passive sensors 407 and active sensors 409. The bus also has input output device 405, processor 411, memory resource 413, which is coupled to mass storage 415 including documents, templates, and other configurations. A course module 350 is coupled to the bus.

Figure 5:
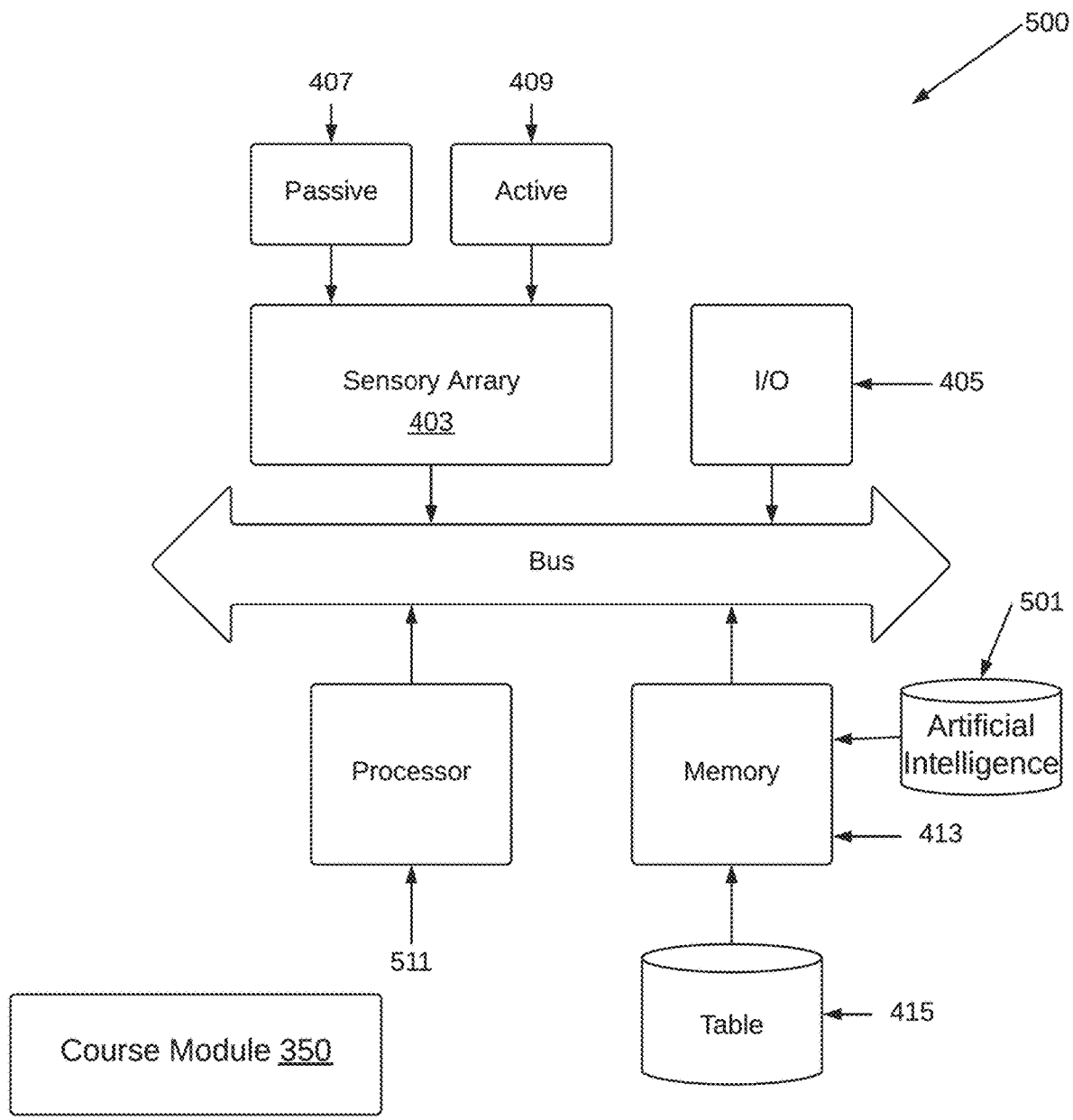
FIG. 5 is a more detailed diagram of an alternative processing system according to an example of the present invention.

FIG. 5 is a more detailed diagram of an alternative processing system 500 according to an example of the present invention. As shown, the system has a bus that communicates to a sensor array 403, which includes both passive sensors 407 and active sensors 409. The bus also has input output device 405, processor 511, which can include artificial intelligence processors, digital signal processors, and other processors, memory resource 413, which is coupled to mass storage 415 including documents, templates, and other configurations. An artificial intelligence module 501 is also coupled to the memory resource. The artificial intelligence module includes configurations that are learned and used in accordance to this example with the course module 350. A course module is coupled to the bus.

Figure 6:
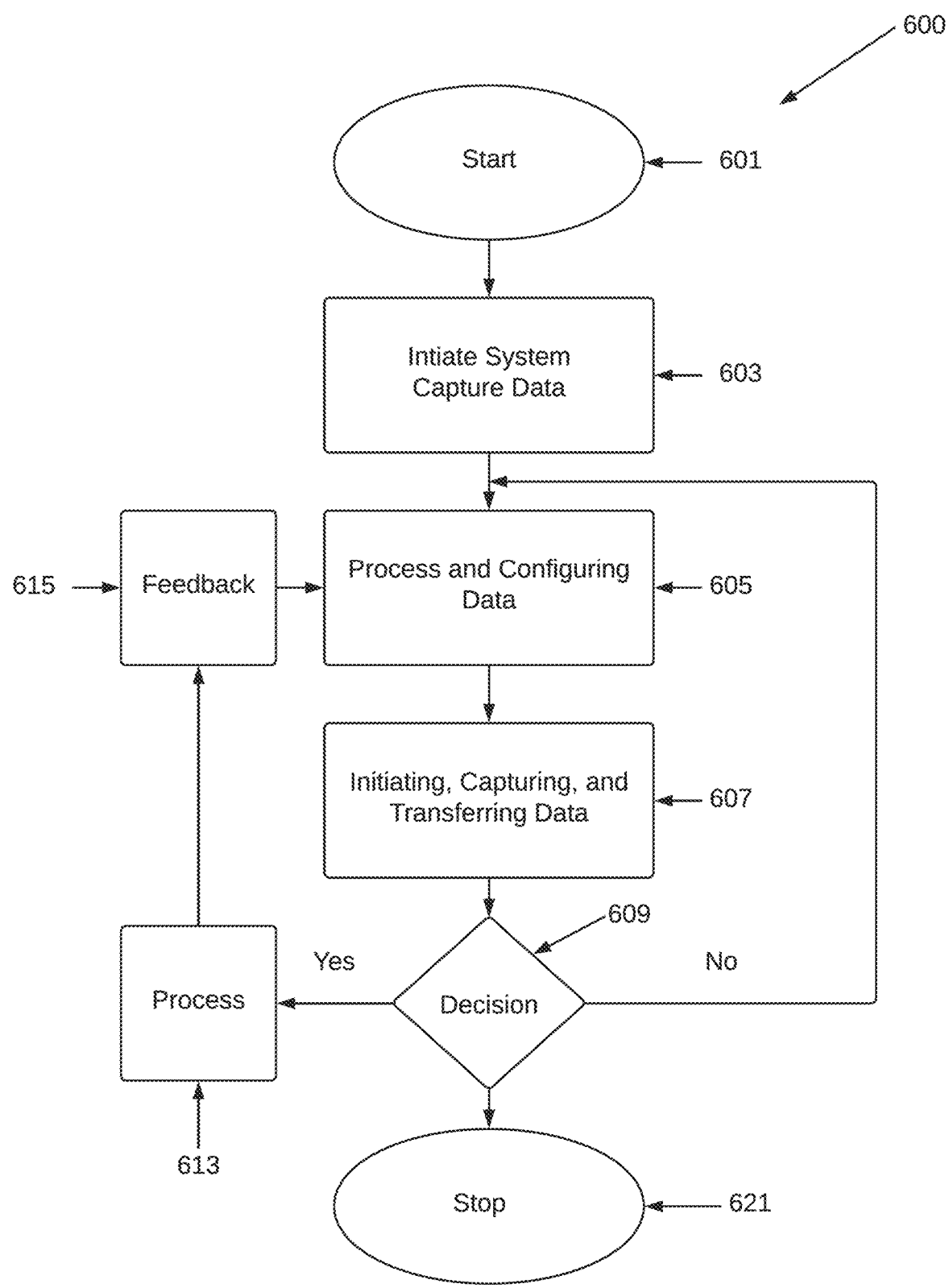
FIG. 6 is a simplified flow diagram of an integrated data processing process according to an example of the present invention.

FIG. 6 is a simplified flow diagram 600 of an integrated data processing process according to an example of the present invention. In an example, the method begins with start, step 601. In an example, the invention provides a method of using the meta module process of capturing data and processing the data for feedback to a user, e.g., learner, student, or other human entity. In an example, the present process provides for a single integrated application to perform various processes that can be implemented using a combination of hardware and software. In an example, the method includes providing information related to a course in a first format, such as a video, a text book, or any combination thereof. In an example, the course can be sourced from an off-line class-room course.

In an example, the method includes transferring the information in the first format to a server device. The server device can be coupled to a plurality of computers on a world wide network of computers, such as the Internet. In an example, the method includes storing the information in the first format into a memory resource coupled to the server device.

In an example, the method includes processing the information related to the course on the server device to convert the course into a second format, the second format comprising a plurality of templates and a video. The second format is suitable for using the course in an on-line manner through the Internet and client devices.

The method configures the course in the second format with a meta module. As noted, the meta module comprises an artificial intelligence module. In an example, the artificial intelligence module comprises a plurality of input interfaces each of the input interfaces coupled to a node. In an example, each of the nodes comprises a weighing function. In an example, each of the nodes is coupled to an output interface.

In an example, the artificial intelligence module comprises a neural network process configured on a neural network process, wherein the plurality of nodes comprises at least 1 million nodes. In an example, the artificial intelligence module comprises a neural network process configured on a processing device.

In an example, the method initiates 603 capturing data from a plurality of sensing devices, which can be internal or external, passive, or active in an example, to teach the neural network process including the plurality of nodes with selected weighing functions.

In an example, the method includes configuring 605 the course coupled to the artificial intelligence module to a plurality of external data capturing devices, each of the devices being associated with a weighing function for the neural network process. Each of the plurality of external data captures devices being spatially disposed on a mobile computing device or other device. In an example, the mobile computing device is coupled to the world wide network of computers.

In an example, the method includes initiating 607 use of the course in the second format coupled to the artificial intelligence module from the mobile computing device, among other client devices, and capturing data from a user of the mobile computing device from each of the plurality of external data capturing devices, while the user is actively interacting with the course in the second format from the mobile computing device.

In an example, while using the module associated with the course, if any rules and/or decisions related to neural network process is triggered, step 609, the method processes information 613 associated with such rules and/or decisions, and provides feedback 615 to the user in an example. As further shown, n an example, the method includes transferring data from each of the plurality of external data capturing devices from the mobile computing device to the artificial intelligence module and, thereafter, outputting a feedback 615 from the artificial intelligence module to the user of the course.

In an example, the method also includes finalizing use of the course in the second format; and initiating a test associated with the course. Optionally, the method includes finalizing use of the course in the second format; initiating a test associated with the course; passing the test; and transferring a credit for the course to the user of the mobile device and the course. The method ends at stop, step 621. Of course, there can be other variations, modifications, and alternatives.

Optionally, the method can also includes transferring spatial movement information from a wearable device to the mobile computing device. The wearable device can be a watch, a suit, a vest, a headset, a pair of glasses, a pair of pants, shoes, or other wearable device. The wearable device can include a plurality of sensing devices spatially disposed on the device. A wireless or wired transceiver or transmitter can transmit information from each of the sensors to the meta processor.

In an example, the course module and other elements can be implemented using a mobile device. In an example, the mobile device is a lap top computer, a tablet, an iPad, a Smart phone, or other mobile device. Of course, there can be other variations, modifications, and alternatives.

In an example, various hardware elements of the invention can be implemented using a smart phone with a capture image of a user according to an embodiment of the present invention. As shown, the smart phone includes a housing, display, and interface device, which may include a button, microphone, or touch screen. Preferably, the phone has a high resolution camera device, which can be used in various modes. An example of a smart phone can be an iPhone from Apple Computer of Cupertino Calif. Alternatively, the smart phone can be a Galaxy from Samsung or others.

In an example, the smart phone includes the following features (which are found in an iPhone from Apple Computer, although there can be variations), see www.apple.com, which is incorporated by reference. In an example, the phone can include 802.11b/g/n Wi-Fi (802.11n 2.4 GHz only), Bluetooth 2.1+EDR wireless technology, Assisted GPS, Digital compass, Wi-Fi, Cellular, Retina display, 5-megapixel iSight camera, Video recording, HD (720p) up to 30 frames per second with audio, Photo and video geotagging, Three-axis gyro, Accelerometer, Proximity sensor, and Ambient light sensor. Of course, there can be other variations, modifications, and alternatives.

An exemplary electronic device may be a portable electronic device, such as a media player, a cellular phone, a personal data organizer, or the like. Indeed, in such embodiments, a portable electronic device may include a combination of the functionalities of such devices. In addition, the electronic device may allow a user to connect to and communicate through the Internet or through other networks, such as local or wide area networks. For example, the portable electronic device may allow a user to access the internet and to communicate using e-mail, text messaging, instant messaging, or using other forms of electronic communication. By way of example, the electronic device may be a model of an iPod having a display screen or an iPhone available from Apple Inc.

In certain embodiments, the device may be powered by one or more rechargeable and/or replaceable batteries. Such embodiments may be highly portable, allowing a user to carry the electronic device while traveling, working, exercising, and so forth. In this manner, and depending on the functionalities provided by the electronic device, a user may listen to music, play games or video, record video or take pictures, place and receive telephone calls, communicate with others, control other devices (e.g., via remote control and/or Bluetooth functionality), and so forth while moving freely with the device. In addition, device may be sized such that it fits relatively easily into a pocket or a hand of the user. While certain embodiments of the present invention are described with respect to a portable electronic device, it should be noted that the presently disclosed techniques may be applicable to a wide array of other, less portable, electronic devices and systems that are configured to render graphical data, such as a desktop computer.

In the presently illustrated embodiment, the exemplary device includes an enclosure or housing, a display, user input structures, and input/output connectors. The enclosure may be formed from plastic, metal, composite materials, or other suitable materials, or any combination thereof. The enclosure may protect the interior components of the electronic device from physical damage, and may also shield the interior components from electromagnetic interference (EMI).

The display may be a liquid crystal display (LCD), a light emitting diode (LED) based display, an organic light emitting diode (OLED) based display, or some other suitable display. In accordance with certain embodiments of the present invention, the display may display a user interface and various other images, such as logos, avatars, photos, album art, and the like. Additionally, in one embodiment, the display may include a touch screen through which a user may interact with the user interface. The display may also include various function and/or system indicators to provide feedback to a user, such as power status, call status, memory status, or the like. These indicators may be incorporated into the user interface displayed on the display.

In an embodiment, one or more of the user input structures are configured to control the device, such as by controlling a mode of operation, an output level, an output type, etc. For instance, the user input structures may include a button to turn the device on or off. Further the user input structures may allow a user to interact with the user interface on the display. Embodiments of the portable electronic device may include any number of user input structures, including buttons, switches, a control pad, a scroll wheel, or any other suitable input structures. The user input structures may work with the user interface displayed on the device to control functions of the device and/or any interfaces or devices connected to or used by the device. For example, the user input structures may allow a user to navigate a displayed user interface or to return such a displayed user interface to a default or home screen.

The exemplary device may also include various input and output ports to allow connection of additional devices. For example, a port may be a headphone jack that provides for the connection of headphones. Additionally, a port may have both input/output capabilities to provide for connection of a headset (e.g., a headphone and microphone combination). Embodiments of the present invention may include any number of input and/or output ports, such as headphone and headset jacks, universal serial bus (USB) ports, IEEE-1394 ports, and AC and/or DC power connectors. Further, the device may use the input and output ports to connect to and send or receive data with any other device, such as other portable electronic devices, personal computers, printers, or the like. For example, in one embodiment, the device may connect to a personal computer via an IEEE-1394 connection to send and receive data files, such as media files. Further details of the device can be found in U.S. Pat. No. 8,294,730, assigned to Apple, Inc.

In an example, natural language processing can include, syntax, semantics, discourse, and speech, as can be found in Wikipedia.com, which is hereby incorporated by reference herein.

Having described various embodiments, examples, and implementations, it should be apparent to those skilled in the relevant art that the foregoing is illustrative only and not limiting, having been presented by way of example only. Many other schemes for distributing functions among the various functional elements of the illustrated embodiment or example are possible. The functions of any element may be carried out in various ways in alternative embodiments or examples.

Also, the functions of several elements may, in alternative embodiments or examples, be carried out by fewer, or a single, element. Similarly, in some embodiments, any functional element may perform fewer, or different, operations than those described with respect to the illustrated embodiment or example. Also, functional elements shown as distinct for purposes of illustration may be incorporated within other functional elements in a particular implementation. Also, the sequencing of functions or portions of functions generally may be altered. Certain functional elements, files, data structures, and so one may be described in the illustrated embodiments as located in system memory of a particular or hub. In other embodiments, however, they may be located on, or distributed across, systems or other platforms that are co-located and/or remote from each other. For example, any one or more of data files or data structures described as co-located on and "local" to a server or other computer may be located in a computer system or systems remote from the server. In addition, it will be understood by those skilled in the relevant art that control and data flows between and among functional elements and various data structures may vary in many ways from the control and data flows described above or in documents incorporated by reference herein. More particularly, intermediary functional elements may direct control or data flows, and the functions of various elements may be combined, divided, or otherwise rearranged to allow parallel processing or for other reasons. Also, intermediate data structures of files may be used and various described data structures of files may be combined or otherwise arranged.

In other examples, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

The invention claimed is:

1. An apparatus for processing sensor inputs and providing feedback to a user for an on-line course, the apparatus comprising:
 a housing configured with a display device, the display device coupled to an input device for communicating text information from a user;
 a processing device;
 a network interface coupled to the processing device, the network interface being configured to couple to a network of computers;
 a memory resource coupled to the processing device;
 an application comprising a course module, the course module comprising a plurality of templates and at least one video file;
 an image capturing device coupled to the housing and configured to the processing device, the image capturing device being configured to capture an image of at least a facial expression of the user while the user is interacting with the course module;
 one or more spatial orientation sensors configured to identify a spatial orientation of the user while the user is interacting with the course module;
 a natural language processor configured for processing information from the text information while the user is interacting with the course module;
 an artificial intelligence module coupled to the processing device, the artificial intelligence module comprising a neural network module comprising a plurality of nodes respectively coupled to the image capturing device, the natural language processor, and the one or more spatial orientation sensors, the artificial intelligence module configured to:
  receive user-related information from the one or more spatial orientation sensors, image capturing device, or natural language processor, and
  output feedback information according to the user-related information; and
 an output handler coupled to the output of the neural network module, the output handler configured to provide feedback according to the feedback information to the user.

2. The apparatus of claim 1 wherein the feedback comprises a plurality of characteristics to allow the user to achieve a predetermined score within a range for the course.

3. The apparatus of claim 1 wherein the natural language processor is configured to process the text information to identify a characteristic of the user in association with the course, and the neural network module produces the feedback information according to the characteristic of the user.

4. The apparatus of claim 1, further comprising:
 one or more additional sensors, the one or more additional sensors including a keyboard, an accelerometer sensor, an rf sensor, a gyroscope, a chemical sensor, a temperature sensor, or a microphone,
 wherein the neural network module is configured to also receive the user-related information from the one or more additional sensors.

5. The apparatus of claim 1 further comprising a wearable device comprising a set of sensors to characterize movement, orientation, temperature, heart rate, or breathing rate of the user while interacting with the course,
 wherein the neural network module is configured to also receive the user-related information from the wearable device.

6. The apparatus of claim 1 wherein the neural network module is configured to receive information from the image capturing device and output a learning characteristic of the user in the feedback information.

7. The apparatus of claim 1, wherein the neural network module is configured to:

receive information associated with the facial expression captured by the image capturing device and an eye response captured by the image capturing device, and output a learning characteristic of the user in the feedback information.

8. An apparatus for processing sensor inputs and providing feedback to a user for an on-line course and to configure the on-line course, the apparatus comprising:

a housing configured with a display device, the display device coupled to an input device for communicating text information from a user;

a processing device;

a network interface coupled to the processing device, the network interface being configured to couple to a network of computers;

a memory resource coupled to the processing device;

an application comprising a course module, the course module comprising a plurality of templates and at least one video file;

an image capturing device coupled to the housing and configured to the processing device, the image capturing device being configured to capture an image of at least a facial expression of the user while the user is interacting with the course module;

one or more spatial orientation sensors configured to identify a spatial orientation of the user while the user is interacting with the course module;

a natural language processor configured for processing information from the text information while the user is interacting with the course module;

an artificial intelligence module coupled to the processing device, the artificial intelligence module comprising a neural network module comprising a plurality of nodes respectively coupled to the image capturing device, the natural language processor, and the one or more spatial orientation sensors, the artificial intelligence module configured to:

receive user-related information from the one or more spatial orientation sensors, image capturing device, or natural language processor, and output feedback information according to the user-related information; and an output handler coupled to the output of the neural network module, the output handler configured to provide feedback according to the feedback information to the user and configure the on-line course.

9. The apparatus of claim 8 wherein the feedback comprises a plurality of characteristics to allow the user to achieve a predetermined score within a range for the course; wherein the on-line course comprises a personally designed course based upon the feedback to the user.

10. The apparatus of claim 8 wherein the natural language processor is configured to process the text information to identify a characteristic of the user in association with the course, the natural language processor comprising a rule based processing process or a statistical based processing process.

11. The apparatus of claim 8, further comprising, one or more additional sensors, the one or more additional sensors including a keyboard, an accelerometer sensor, an rf sensor, a gyroscope, a chemical sensor, a temperature sensor, or a microphone, wherein the neural network module is configured to also receive the user-related information from the one or more additional sensors.

12. The apparatus of claim 8 further comprising a wearable device comprising a set of sensors to characterize movement, orientation, temperature, heart rate, or breathing rate of the user while interacting with the course, wherein the neural network module is configured to also receive the user-related information from the wearable device.

13. The apparatus of claim 8 wherein the neural network module is configured to receive information from the image capturing device and output a learning characteristic of the user in the feedback information.

14. The apparatus of claim 8, wherein the neural network module is configured to:

receive information associated with the facial expression captured by the image capturing device and an eye response captured by the image capturing device, and output a learning characteristic of the user in the feedback information.

* * * * *